(12) United States Patent
Turner et al.

(10) Patent No.: US 8,943,499 B2
(45) Date of Patent: Jan. 27, 2015

(54) PROVIDING A VIRTUAL NETWORK TOPOLOGY IN A DATA CENTER

(75) Inventors: Yoshio Turner, San Francisco, CA (US); Jeongkeun Lee, Mountain View, CA (US); Myung Jin Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 13/460,836

(22) Filed: Apr. 30, 2012

(65) Prior Publication Data

US 2013/0290955 A1    Oct. 31, 2013

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| 8,102,781 | B2 | 1/2012 | Smith |
| 2010/0049637 | A1 | 2/2010 | Laventman et al. |
| 2011/0225277 | A1 | 9/2011 | Freimuth et al. |
| 2011/0295728 | A1 | 12/2011 | Bulumulla et al. |

OTHER PUBLICATIONS

Benson T. et al., CloudNaaS: a Cloud Networking Platform forEnterprise Applications, SOCC 2011. Proceedings of the 2nd ACM Symposium on Cloud Computing, Oct. 27-28, 2011.*
Mudigonda, J. et al., "Netlord: a Scalable Multi-tenant Network Architecture for Virtualized Datacenters," Found at URL < http://www.hpl.hp.com/personal/Praveen_Yalagandula/papers/SIGCOMM2011-Nettord.pdf >, ACM SIGCOMM Computer Communication Review—SIGCOMM 2011. Aug. 15-19, 2011, pp. 62-73, vol. 41, No. 4.
Benson, T. et al., "CloudNaaS: a Cloud Networking Platform for Enterprise Applications," Found at URL <http://pages.cs.wisc.edu/~tbenson/papers/CloudNaaS.pdf>, SOCC 2011. Proceedings of the 2nd ACM Symposium on Cloud Computing. Oct. 27-28, 2011.

* cited by examiner

*Primary Examiner* — Emerson Puente
*Assistant Examiner* — Sisley Kim (57) ABSTRACT

Topology input is used to identify a set of data flows as between a set of virtual machines (VMs), as well as one or more network services for one or more of the data flows. A determination is made as to a minimal number of network service virtual machines (NSVMs) for use in providing the one or more network services. An arrangement is determined for server resources and network resources of the data center network on which a virtual network topology is provided for the tenant, including the set of VMs and the number of NSVMs.

11 Claims, 6 Drawing Sheets

PROVIDING A VIRTUAL NETWORK TOPOLOGY IN A DATA CENTER

BACKGROUND

Until recently, conventional data centers relied on physical equipment to provide servers and network services for tenants. More recently, data centers are increasingly relying on virtualization in place of hardware for servers and network services.

DETAILED DESCRIPTION

According to embodiments described herein, a desired virtual network topology of a tenant in a cloud data center network can be analyzed for purpose or arranging data center servers and resources to provide the desired network topology. In some embodiments, the desired virtual network topology is mapped to physical resources of a data center network in a manner that intelligently utilizes resources of the data center, particularly as to reducing or minimizing the overall cost of implementing the desired virtual network.

Embodiments recognize that for the rapidly growing cloud computing paradigm, a critical requirement is for cloud infrastructure providers to automatically provision advanced network services on behalf of tenants in a shared cloud datacenter. These network services include load balancing, firewall functionality, intrusion detection and prevention, and monitoring, among many other functions. In cloud data centers, these network services can be deployed as specialized virtual machines (VMs) along with tenants VMs.

In an embodiment, a virtual tenant network topology input is received from a tenant of the data center. The topology input can be used to identify a set of data flows as between a set of virtual machines (VMs), and one or more network services for one or more of the data flows. A determination can be made as to a minimal number of network service virtual machines (NSVMs) for use in providing the one or more network services. An arrangement can be determined for server resources and network resources of the data center on which a virtual network topology, including the set of VMs and the number of NSVMs, is provided for the tenant.

In variations, a set of optimization constraints can be determined that are relevant to a cost for providing the virtual network topology. As examples, the set of optimization constraints can be based on a cost associated with each of the NSVMs, as well as on a cost associated with server resources used in providing the virtual network topology.

Embodiments recognize that absent optimization considerations, a virtual network topology for a tenant can overuse VMs, NSVMs, and server resources, resulting in added cost to both the tenant and the data center provider. Accordingly, embodiments described herein include optimization considerations for implementing a virtual network topology onto the physical resources of a data center network. Among other benefits, the optimization considerations enable use of fewer virtual and/or physical resources, resulting in cost-reduction for the tenant, and efficiency for the data center provider.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

System Description

Figure 1:
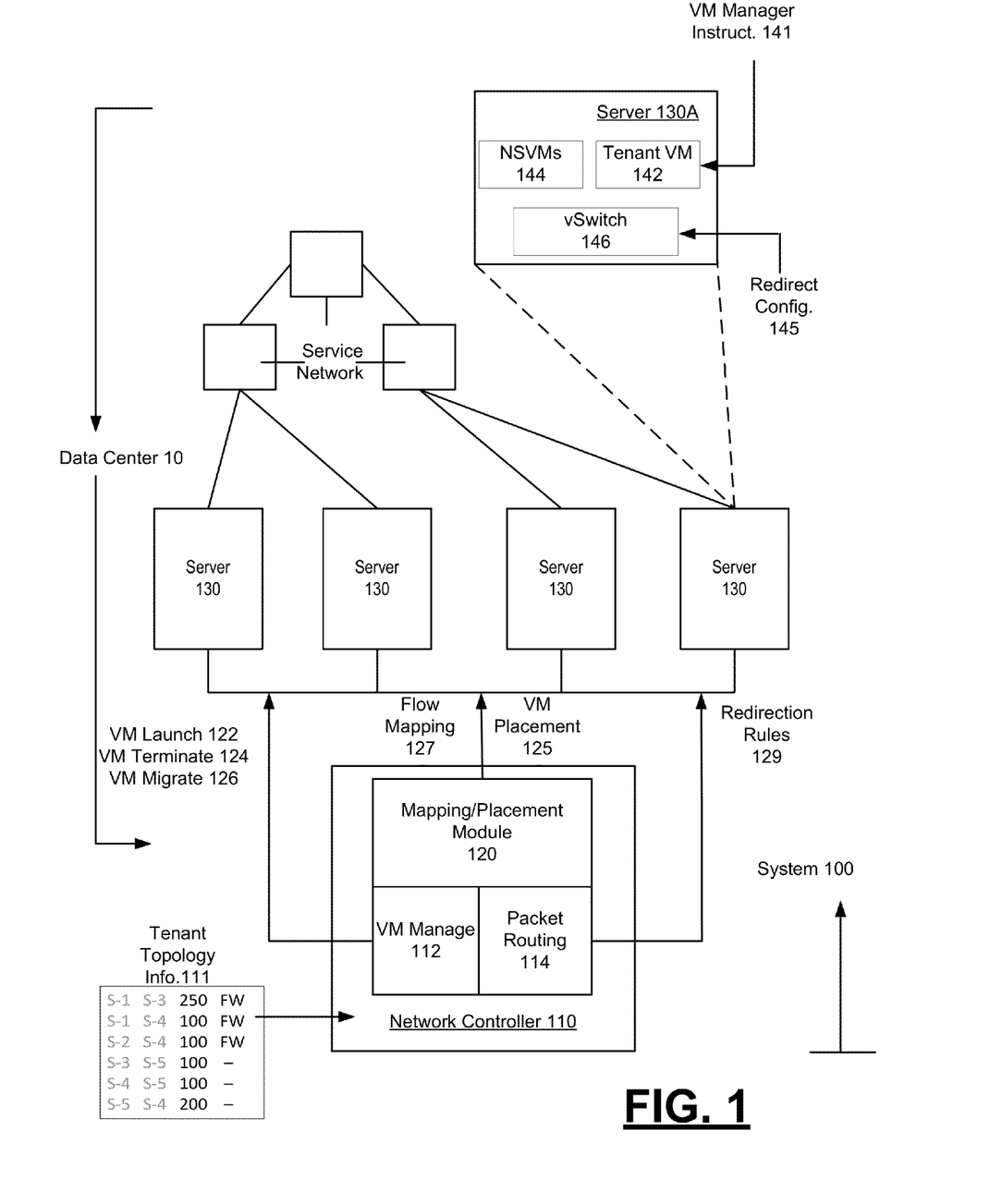
FIG. 1 illustrates an example system for providing a virtual network topology in a data center network, according to one or more embodiments.

FIG. 1 illustrates an example system for providing a virtual network topology in a data center, according to one or more embodiments. A system 100 can be implemented on machines and other physical resources of a data center network 10. As an example, the data center network 10 can correspond to a cloud network which tenants (or customers) can utilize in providing tenant services.

In an embodiment, system 100 includes a network controller 110 which controls various physical resources (e.g., servers, VM slots, server component or module, management server etc.) in order to implement a virtual tenant topology for one or more tenants of the data center network 10.

In an embodiment, the network controller 110 includes a virtual machine (VM) manager 112, a packet routing module 114, and a mapping or placement module 120 ("mapping/placement module 120"). A tenant user of the data center network 10 can interface with the network controller in order to specify tenant topology information 111. The tenant topology information 111 can identify at least some components for a desired tenant topology. In the example provided by FIG. 1, the tenant topology information 111 specifies (i) a set of data flows, each data flow identifying a source and destination VM within the data center, (ii) a set of tenant VMs, (iii) a bandwidth constraint for one or more of the data flows in the set of data flows, and (iv) one or more network services for at least some of the data flows. In the example provided, the tenant topology information 111 can be in the form of a matrix that specifies data flows in the form of source and destination VMs, bandwidth constraints, and network services (e.g., firewalls) needed between the data flows. For example, with reference to FIG. 1, the topology information 111 can take the form of a matrix which includes rows that identify a data flow as between a source and destination VMs (e.g., S-1, S-3 in row 1), as well as a bandwidth constraint for the data flow (e.g., '250' in row 1) and a network service for that data flow (e.g., firewall or FW for row 1).

Embodiments described herein enable the tenant to provide a virtual network topology that satisfies the tenant topology information 111, without need for the tenant to consider physical resources and constraints of the data center. The network controller 110 can operate to programmatically map the various components of the desired virtual network topology to the machines and physical resources of the data center network 10. Moreover, the network controller 110 can implement one or more optimization processes to reduce a cost to the tenant for implementing the desired virtual network topology with the data center network.

According to an embodiment, the mapping/placement module 120 analyzes the tenant topology information 111 to determine (i) a number of VMs that are needed for the desired tenant topology, (ii) placement of individual VMs on machines of the data center network 10, (iii) a number of NSVMs that are needed for the desired tenant topology, and (iv) how data flows should be implemented between the VMs and NSVMs. By way of example, the each NSVM can provide a service such as load balancing, firewall functionality, intrusion detection and prevention, or monitoring. An output of mapping/placement module 120 includes VM placement 125, which identifies each VM and the location or physical resource (e.g., server of the data center network 10) where the particular VM is to be provided. Another output of mapping/placement module 120 includes data flow mapping 127, which determines how specific data flows are to be provided as between the individual VMs and NSVMs.

In analyzing the tenant topology information 111, the mapping/placement module 120 can implement one or more optimization processes in order to reduce the overall cost for providing the virtual network topology of the tenant on the data center network 10. In one embodiment, the mapping/placement module 120 implements multiple optimization processes in order to reduce the cost of mapping the virtual network topology onto the physical resources of the data center. As described with some embodiments, the optimization processes that are performed by the mapping/placement module 120 can accommodate constraints for a number of NSVMs that are needed, an amount of physical resources that the desired tenant topology will require, and one or more bandwidth constraints that are present in the tenant topology information 111 and/or data center network 10. In alternative implementations, the cost function can be determined and optimized based on other parameters, such as NSVM and server costs. According to embodiments, different optimization processes may be used with different cost functions used as optimization objectives. For example, a multi-integer process (MIP) can be implemented for a cost function that includes three costs: the number of NSVMs that are needed, the amount of physical resources the desired tenant topology will require, and the bandwidth constraints present with the data center network 10. As an addition or variation, a heuristic process can be implemented with one or more of the cost functions being relaxed. For example, the heuristic process can optimize the mapping of a given virtual network topology onto the data center resources, based on the number of NSVMs and the amount of server resources that are needed.

As described by other embodiments, the output of the mapping/placement module 120 can be adjusted based on an initial determination, and subsequent adjustments to optimize the tenant layout. For example, the heuristic process can be implemented in determining which VMs are to be swapped with one another with respect to physical location (e.g., host), and/or which VMs are to be migrated from one server to another. The VM manager 112 can operate to generate instructions for initiating, swapping and migrating VMs as needed, based on the output of the mapping/placement module 120.

The VM manager 112 can communicate with the various servers 130 (e.g., management servers) and/or service network components 132 of the data center network 10 to implement a given virtual network topology. In particular, the VM manager 112 can signal VM launch 122 to launch VMs for the tenant topology, VM terminate 124 to terminate VMs (e.g. such as when swapping a VM at one physical location), and VM migrate 126 to migrate a VM from one server or location to another.

According to some embodiments, the packet routing module 114 configures redirection rules for use on the servers of the data center network 10 in order to implement the desired data flows and use of NSVMs. The packet routing module 114 can also act as an interface to individual controllers that are resident on the various servers of the data center network 10. The packet routing module 114 enables, for example, data packets of individual flows to be inspected and routed to FW (firewall) NSVMs as needed.

The system 100 can include components that reside on, or are otherwise provided with, the servers or physical resources of the data center network 10. The server 130A is illustrative of other servers 130 in the data center. In the example provided, the server 130A includes a set of VMs 142, a set of NSVMs 144, and resources for enabling mapping and flow direction within and to/from the particular server (e.g., virtual switch 146). The server 130A can be considered representative of other servers that comprise the data center network 10. The set of VMs 142 and NSVMs 144 can be utilized for more than one tenant topography (e.g., multiple tenants can include topographies that utilize a same server).

In an embodiment, the server 130A is configured to process control instructions, including VM manager instructions 141 (e.g., VM launch 122) to initiate VMs for the particular tenant and/or NSVMs. The virtual switch 146 can receive and process data packets. The virtual switch 146 can process the data packets by redirecting the data packets internally, or forwarding the data packets out of the server 130A. The redirection configuration information 145 can be used to enable the virtual switch 146 to implement its redirections. The redirection configuration information 145 can be based on the redirection rules 129, as well as other signals provided from the mapping/placement module 120 in response to the tenant topology information 111. The redirection configuration information 145 can include descriptions of packet header fields for matching (e.g., source and destination MAC/IP addresses) and actions (i.e., rewriting destination MAC address). For example, the virtual switch 146 can rewrite the individual data packets' destination MAC address to NSVM's MAC address, and forward the packets to the switch port which the NSVM is connected to.

Methodology

Figure 2:
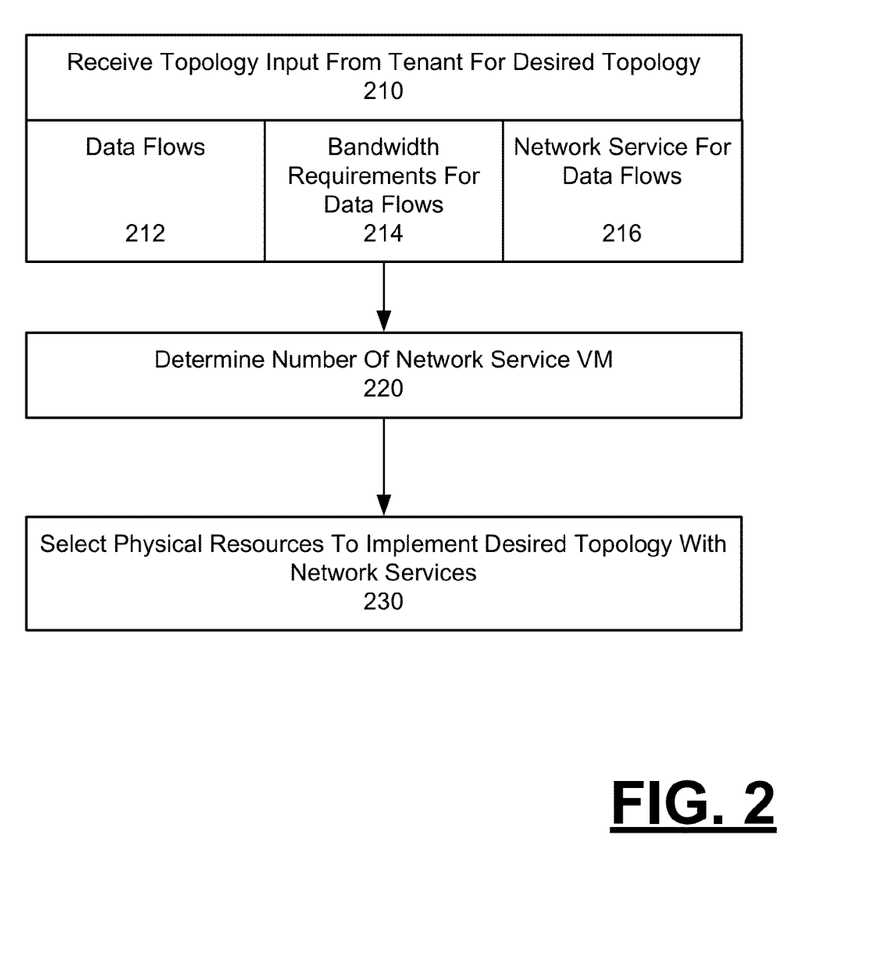
FIG. 2 illustrates a method for operating a network controller to arrange data center resources, in providing a desired virtual network topology, according to one or more embodiments.

FIG. 2 illustrates a method for operating a network controller to arrange data center resources, in provide a desired virtual network topology for a tenant, according to one or more embodiments. A method such as described by an embodiment of FIG. 2 can be implemented using a network controller 110 and/or system 100 such as described with an embodiment of FIG. 1. Accordingly, reference may be made to elements or components of FIG. 1 for purpose of illustrating suitable components or elements for performing a step or sub-step being described.

In an embodiment, topology input is received from a tenant for a desired virtual network topology (210). The topology input can specify data flows (212), including source and destination VMS, bandwidth requirements for data flows (214), and network services for data flows (216). As an example, the topology input can be provided as a matrix, such as illustrated by an example of FIG. 1.

In an embodiment, a number of NSVMs are determined (220) for the tenant topology. In some embodiments, the number of network services is a minimum number of network services that are needed in order to effectively implement the desired tenant topology requirements. The number of NSVMs can correspond to a determined optimal number, based on, for example, cost associated with use of the NSVM (e.g., licensing cost for instance of operation) on the tenant's virtual network. In one implementation, a cost function is determined and subjected to optimization in order to determine a minimal (or near minimal, depending on the results of the optimization process) number of NSVMs for implementing the tenant topology.

The physical resources for implementing the desired tenant topology are selected (230). According to some embodiments, the physical resources are selected based on a result of one or more optimization processes. As described further, the optimization processes can be implemented to minimize a cost function, using constraints such as the number of NSVMs needed (220), the amount of server resources needed, and/or bandwidth constraints.

Mapping Virtual Network Topology with Optimization Considerations

Figure 3:
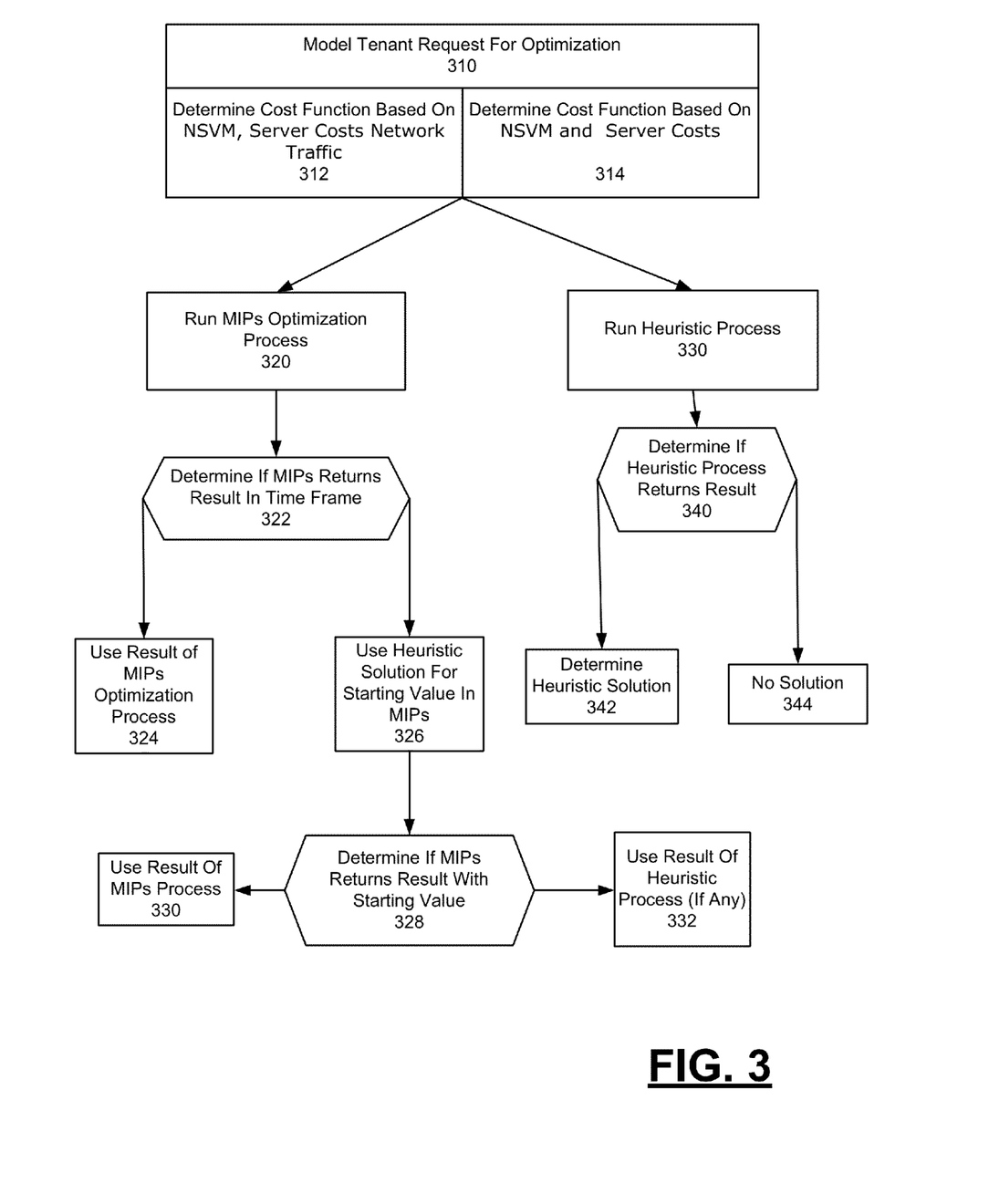
FIG. 3 illustrates an example method for implementing a desired virtual network topology using physical resources of a data center with optimization considerations, according to one or more embodiments.

FIG. 3 illustrates an example method for implementing a desired virtual network topology onto physical resources of a data center with optimization considerations, according to one or more embodiments. A method such as described by an embodiment of FIG. 3 can be implemented using a network controller 110 and/or system 100 such as described with an embodiment of FIG. 1. Accordingly, reference may be made to elements or components of FIG. 1 for purpose of illustrating suitable components or elements for performing a step or sub-step being described.

In an example provided, a tenant request can be modeled for optimization, based on, for example, tenant topology information 111 (see FIG. 1) or information identifying available physical resources of the data center network 10 (310). According to an embodiment, the optimization model is based on an objective function that is minimized subject to a set of constraints. In one embodiment, the objective function is a sum of NSVM, server costs and network traffic (312). In variations, the objective function incorporates different costs. For example, the objective function to be minimized may combine a sum of NSVM and server costs (314).

In one implementation, a MIP model optimization process is utilized to determine a tenant network topology on the data center server and network resources (320). In another embodiment, a heuristic process may be used to determine the tenant network topology on the data center (330). Examples of each of the MIP and heuristic process are described in more detail below.

As illustrated by an example of FIG. 3, a dynamic scheme can be implemented to run both a MIP and a heuristic process to model a particular virtual network topology for a particular tenant. In particular, an embodiment provides for running both a MIP and a heuristic process in response to a tenant request. As noted, an embodiment provides for running the heuristic process at the same time as the MIPs (330).

A determination can be made as to whether the MIP returns a result (322). For example, a time limit can be imposed for the network controller to provide a result when running the MIP. If the MIP returns a result, then that result is used (324) and the optimization process is complete. A determination can also be made as to whether the heuristic process returns an acceptable result (340). If the heuristic process returns an acceptable solution, the solution is determined (342). If not, then no solution is determined for the heuristic process (344).

Returning to (322), if no result is returned by the MIP (e.g., time limit exceeded), then the process may look to the heuristic process for a starter value unless if the result of the heuristic process is that no solution exists for the heuristic process. Otherwise, the results of the heuristic process are used as starter values for the MIP (326), and a determination is made as to whether the MIP with the starter values (provided from the heuristic process) returns an acceptable result (e.g., within a designated time period) (328). If an acceptable result is provided with the MIP, then the result of the MIP is used to determine the virtual network topology of the tenant (330). Otherwise the result of the heuristic process is used (332), which can include the heuristic solution for the virtual network topology (342) or no solution at all (344).

MIP Optimization Process

In more detail, the MIP model optimization process can be implemented with the following input sets and parameters.

N: Network Service VMs available for handling tenant requests.

T: Tenant VMs to place, where N∩T=Ø.

V: A set of all VMs. N∪T

H: Host (or server) machine given to the MIP model for placing all tenant VMs and needed NSVMs.

F: Flows between tenant VMs. T×T.

S: A set of network services, like firewalls or intrusion prevention.

R: H×H. Routing paths between host machines. An external routing module can be assumed to provide a directional path for any given source and destination host pair.

O={1, . . . , m+1}, which is an ordered set of routing hop index.

M is the maximum length of a network service chain.

Furthermore, the binary integer variables that can be used in the MIP model can include:

MA: F×N→{0,1}. A flow-to-NSVM mapping.

NU: N→{0,1}. Whether a NSVM is used by any flow or not.

PL: V×H→{0,1}. A VM placement matrix.

HU: H→{0,1}. Whether a host, h, is and has been used to place any VM or not.

RO: F×R×O→0,1. A routing matrix RO [f,r,1]=1 means that a flow f is routed over a routing path r on its first hop, from its source VM to the next VM, which is either a NSVM or the destination VM.

In one example, the objective function can be expressed as a cost function:

$$\text{Cost}=N\text{Scost}*\Sigma_{v \in N}NU[v]+\text{hostcost}*\Sigma_{h \in H}HU[h]+\\ I\text{cost}*\Sigma_{f \in F}(\text{minrate}(f))*\Sigma_{r \in R}(\text{dist}(r)*\\ \Sigma_{o \in O}RO[f,r,o]))$$

where NScost can be assumed to be the cost of deploying one NSVM, hostcost can be assumed to be the cost of maintaining and running one hostmachine, and Icost can represent conversion of the total traffic on physical links to a unified cost metric ($/hr). The minrate(f) can be assumed as the minimum rate that flow f requires and dist(r) is the number of links that a route r traverses. Server consolidation can be achieved by treating hosts that are already partially-occupied by existing tenants as 'used' hosts. This treatment can be implemented by setting HU[h]=1. This treatment provides incentives for using the partially-occupied hosts instead of using a fully empty host.

To preserve a required minimum rate, one embodiment can assume knowledge of the routing path, for purpose of checking each flow to determine whether the sum of minimum rates of flows traversing any link and/or switch exceeds their respective capacity limits. Under a scenario where there exists only one routing path between a given pair of hosts, a routing path used by a flow f can be directly determined by the placements of the source and destination VMs of f, but only if f does not require a network service. In the other case when f is mapped to an NSVM, the routing of f is determined by mapping MA and placement PL. A determination is made as to which NSVM is serving f AND which host the NSVM is placed on, where AND is a condition that can be expressed by multiplying MA and PL. The routing variable RO can be used to impose a dependency between the binary variables MA, PL and RO by the following inequality constraints.

In case f does not need NS, if the source VM of f(f.src) is placed on the host where the route r starts (r.start) and the destination VM of f(f.dst) is placed on the host where the path r ends (r.end), then f is routed over r on its first hop, thus RO[f, r, 1] is 1.

$$PL[f.src,r.start]+PL[f.dst,r.end] \leq 1+RO[f,r,1],$$
$$\forall f|(ns(f)+0)\in F, \forall r\in R$$

where ns(f) is the number of network services that flow f requires.

For cases where f requires one or more network services (ns(f)>0), the term ord(f,s) is defined as the order in which f requires the services. For example, ord(f,FW)=2 means firewall service should be applied to f as a second service among the chain of services that f requires. A binary parameter st(v,s) can also be defined that indicates whether the service type of NSVM v is s or not. For a service s such that ord(f, s)=1, t f is routed over r on its 1st hop if f.src is placed on r.start and a NSVM v, which provides the service s (i.e., stype(v, s)=1), is placed on r.end and f is mapped to v.

$$PL[f.src,r.start]+PL[v,r.end]+MA[f,v] \leq 2+RO[f,r,1],$$
$$\forall f|(ns(f)>0)\in F, \forall s|(ord(f,s)=1)\in S,$$
$$\forall v|(st(v,s)=1)\in N, \forall r\in R$$

For s that f requires as its last service (ord(f, s)=ns(f)), if NSVM v with st(v, s)=1 is placed on r.start and f.dst is placed on r.end and f is served by v, then f is routed over r at its last hop, =(ns(f)+1)th hop.

$$PL[v,r.start]+PL[f.dst,r.end]+MA[f,v] \leq 2+$$
$$RO[f,r,ns(f)+1], \forall f|(ns(f)>0)\in F, \forall s|(ord(f,s)=ns(f))\in S, \forall v|(st(v,s)=1)\in N, \forall r\in R$$

When f requires only one service (ns(f)=1), additional constraints may not be needed. Replacing ns(f) by 1 can simplify the above inequality for ease of understanding. In the other case when f requires more than one network service, the following constraint can be determined to ensure the route between ith NSVM and i+1th NSVM that f traverses.

$$PL[v1,r.start]+PL[v2,r.end]+MA[f,v1]+$$
$$MA[f,v2] \leq 3+RO[f,r,i+1], \forall f|(ns(f)>1)\in F,$$
$$\forall i|(i<ns(f))\in O \forall s1|(ord(f,s1)=i)\in S,$$
$$\forall v1|(st(v1,s1)=1)\in N, \forall s2|(ord(f,s2)=i+1)\in S,$$
$$\forall v2|(st(v2,s2)=1)\in N, \forall r\in R$$

The use of such additional constraints can facilitate or ensure the placement, mapping and routing are done correctly. The use of additional constraints can also ensure the NU and HU variables are derived correctly from MA and PL variables, respectively. Additionally, the use of additional constraints can impose capacity limits of each physical link, vSwitch and host server. In the latter case, the 'available' capacity of each network and host resource can be including counting the traffic of already deployed tenants.

Embodiments recognize that that an optimization process such as provided by MIPs can overwhelm computing resources on occasion.

Heuristic Optimization Process

Figure 4:
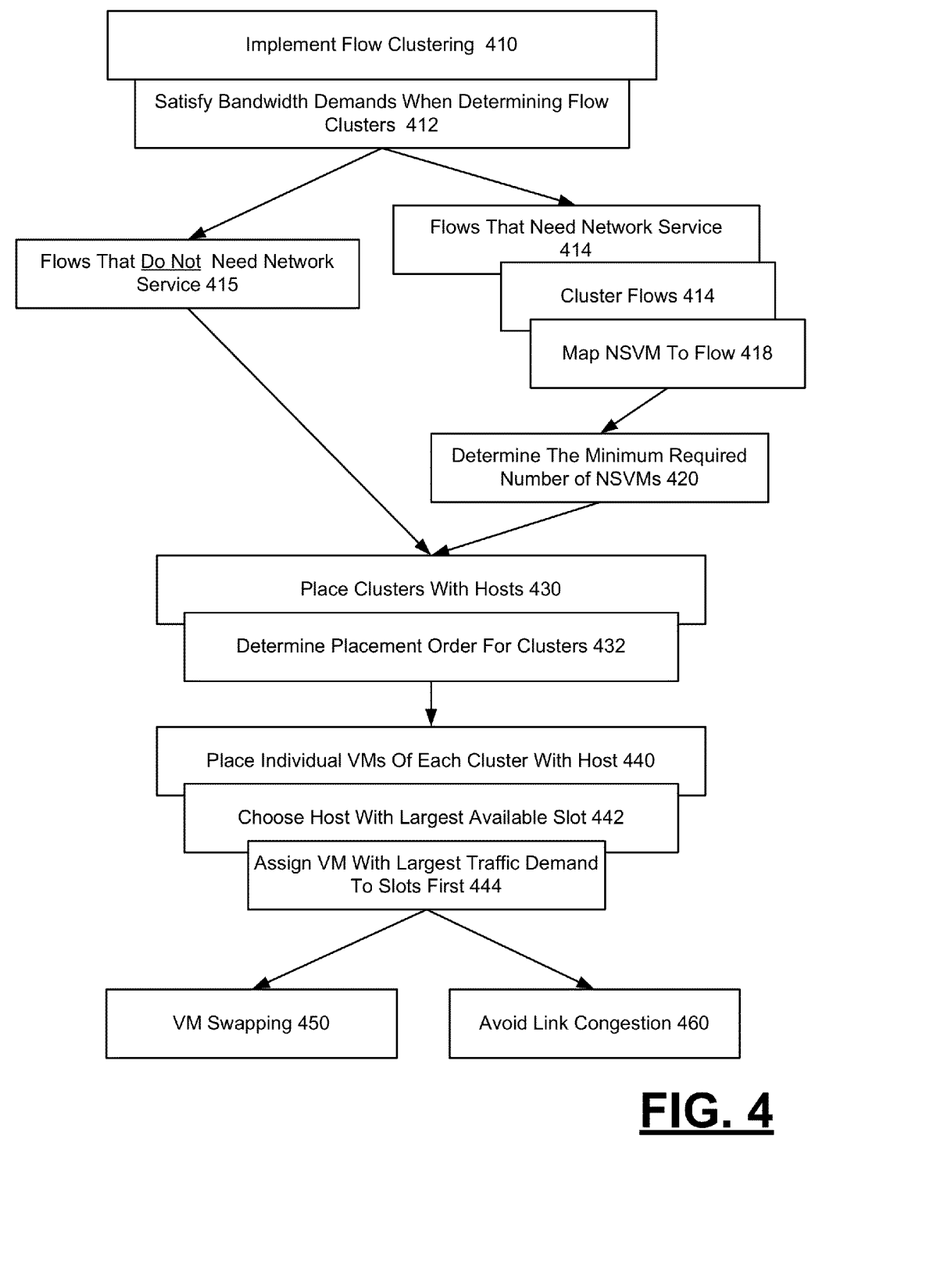
FIG. 4 illustrates an example of a heuristic process for mapping a tenant request to physical resources of a data center network, according to one or more embodiments.

FIG. 4 illustrates in more detail an example of a heuristic process for mapping a tenant request to physical resources of a data center network, according to one or more embodiments. A method such as described by an embodiment of FIG. 4 can be implemented using a network controller 110 and/or system 100 such as described with an embodiment of FIG. 1. Accordingly, reference may be made to elements or components of FIG. 1 for purpose of illustrating suitable components or elements for performing a step or sub-step being described.

For a tenant request, flow clustering is performed based on the tenant input (410). The flow clusters are identified such that the sum of bandwidth demands of the flows does not exceed either switching capacity of a virtual switch or processing capacity of an NSVM (412). Given the tenant request input, which can be provided in, for example, terms of a bandwidth demand matrix, flows are clustered into groups depending on the type of each flow—those that need NSVM support (414) and the others that do not (415).

In one embodiment, data flows that need NSVM are clustered first (416). After clustering completes, NSVMs are mapped to data flows (418). The total bandwidth demand and processing capacity of an NSVM determines n, the minimum required number of NSVMs (420). In one embodiment, the flows with the largest amount of traffic to an NSVM are assigned first, until at least 1/n of the processing capacity of the NSVM is filled. Note that a VM can belong to several clusters at this stage.

The clusters are assigned to hosts (430). The placement order of clusters are determined (432). The placement orders can be determined from a score assigned to each cluster. In some examples, the score can be determined from score=b/k/v, where b is the total amount of bandwidth demand, k is the total number of flows and v is the number of tenant VMs in the given cluster. In one implementation, the VMs in the cluster with higher score are placed first. In one implementation, the score can be determined from a total amount of bandwidth demand, a total number of flows and a number of tenant VMs in the cluster. An embodiment such as described recognizes that there exists a cluster with a small number of VMs and flows, but the amount of bandwidth demand is high in a cluster, the placement of elements of that cluster can be performed early in the overall sequence, that will give the best chance for finding a localized placement for the VMs of the particular cluster. In many cases, locality can be important, as intelligent VM locality can reduces the bandwidth consumption on the physical link, while maintaining many data flows local to the physical server.

The individual VMs of each cluster may be placed with corresponding hosts (440). A heuristic process may choose a physical cluster (e.g., same server rack) that has the largest number of free VM slots (442). The VMs with the largest amount of traffic demand (either sending or receiving) can be assigned to slots first (444). If all slots in the current host get occupied by VMs, a new host closest to the current physical node can be selected and the remaining VMs can be assigned to the new host. The process can be repeated until all VMs in the cluster are assigned to hosts.

VM swapping can optionally be performed to re-locate individual VMs in a manner that reduces constraints of the cost function (450). Additionally, the link congestion can be identified and resolved (460). Generally, VM swapping (450) and addressing link congestion (460) are performed in series or sequentially. With regard to VM swapping (450), the data flows can be sorted in decreasing order by the amount of bandwidth demand. For each data flow, the source and destination VMs constituting the data flow are determined, as well as the servers hosting them. If the two VMs are not located in the same server, VM swapping can be performed, in which the location (e.g., on physical resources) individual VMs that constitute a particular data flow are moved. In particular, VM swapping can be accomplished by co-locating the source and destination VMs of a data flow on a single host. For example, the VM swapping can provide for moving a source or destination VM for a given data flow, from one host to the host of the other of the source or destination VM. The VM swapping can be implemented subject to a condition in which there is at least one remaining VM slot (or sufficient amount of server resource) on the target host. When there is no available VM slot (or server resource) on the hosts of the respective source/destination VMs, the VM swapping can alternatively be performed for a given data flow that is to have co-location as between the source/destination VMs as follows. First, the process identifies another VM having a smaller (or smallest) amount of bandwidth demand in a server where either the source or destination VM of the given data flow is located. Second, the process swaps the identified VM with the source or destination VM of the given data flow. In such instances, measurements can be made as to how much bandwidth demand is relieved from the physical link. A new placement is finalized based on the maximum bandwidth demand released from the physical link.

A link can be defined as being congested if it cannot guarantee a minimum bandwidth demand of all flows crossing it. With the previous VM swapping step (see 450), the chance of causing link congestion can be reduced by including a virtual switch in a server.

With regard to addressing link congestion (460), if physical link is congested, the network can be divided into two partitions (e.g., by cutting the congested link). In case a virtual switch is congested, the physical link, with which the virtual switch is connected to, can be set to being 'congested' so that algorithm responds when the server is overloaded. The VMs causing the congestion can be identified, with VMs in their partition being moved to hosts in another partition. A determination is made as to whether the link congestion is resolved, and conformation is made that the act of moving VMs does not create a new congested link. The operation can be tested until all VMs in one partition move to the other partition, or until the link congestion is resolved.

FIG. 5A through FIG. 5E illustrate an example of a virtual network topology for a tenant that is mapped to physical resources of a data center network using an optimization process, according to one or more embodiments. In the example provided, a heuristic process can be implemented in distributing the components of the virtual network topology onto the physical resources of the data center. In one implementation, the heuristic process can be performed as an alternative to another optimization process, such as, for example, a MIP optimization process (see FIG. 4 and accompanying description).

Figure 5A:
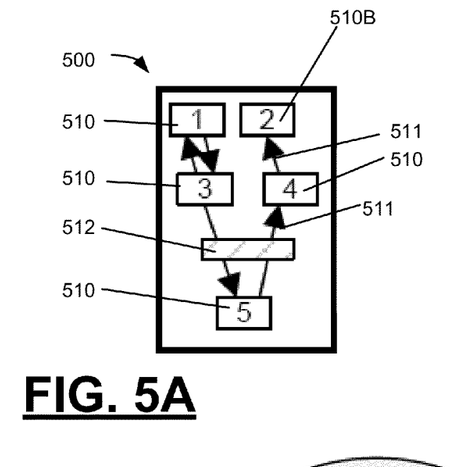
FIG. 5A through FIG. 5E illustrate an example of a virtual network topology for a tenant that is mapped to physical resources of a data center network using an optimization process, according to one or more embodiments.

In FIG. 5A, a desired tenant virtual network topology 500 can be specified from input of the tenant. The tenant virtual network topology 500 can specify VMs 510 (depicted as being numbered, #1, #2, #3, #4, and #5), one or more network services 512, and data flows 511 between source and destination VMs 510. The tenant virtual network topology 500 can also specify data flows 511 that require use of one or more NSVMs 512. The tenant virtual network topology 500 can be defined by, for example, a traffic matrix that lists a set of tenant VMS 510, data flows 511 between VMs 510 (e.g., "pipes"), and source flow requirements. The source flow requirements can include minimum bandwidth (or traffic amount) needed for data flows 511, as well as the type of network service needed.

Figure 5B:
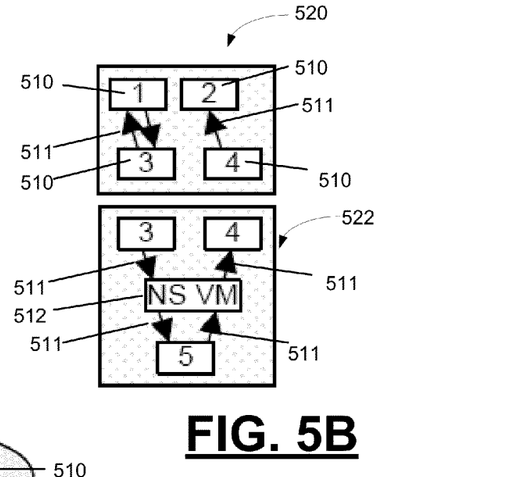

In FIG. 5B, data flows 511 are clustered into two clusters 520, 522 of data flows. In the example shown, the upper cluster 520 includes VMs 510 that do not need NSVM 512, and the bottom cluster 522 includes VM that require the NSVM 513. As noted by FIG. 1, virtual switch 146 (see FIG. 1) can be configured to redirect packets to the NSVM 512 that is provided on a particular host. Accordingly, embodiments described recognize that a sum of the bandwidth demand of flows in cluster 522 that requires the NSVMs 512 should be less than or equal to the switching capacity of a virtual switch, else additional data flows are added to a new data cluster.

Figure 5C:
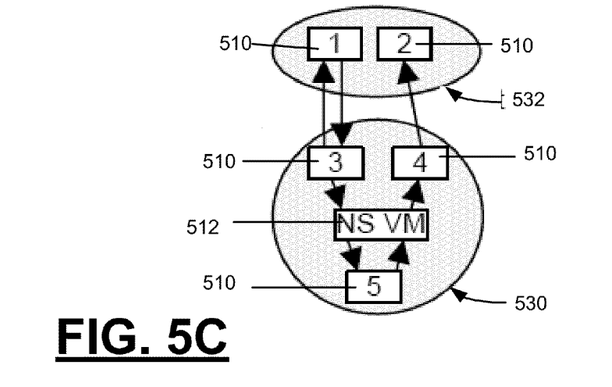
Figure 5D:
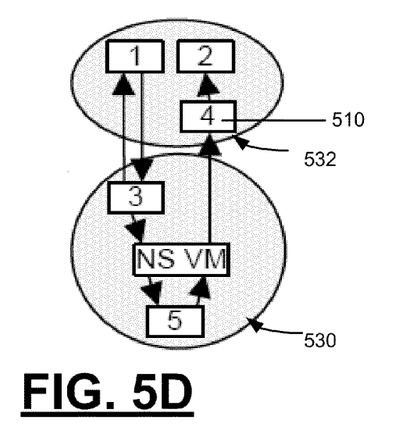

In the state provided by FIG. 5C, the bottom cluster 522 consists of tenant VMs 510 as well as an NSVM 512 to inspect packets among VMs #3, #4, and #5. In the example show, a cluster of flows that require NSVM 512 can be formed. This can optionally be done by creating a new cluster of VMs and then adding the NSVM to the newly added cluster.

The placement order of clusters 520, 522 can be determined by a score assigned to each cluster. VMs 510 in the cluster with the higher score are placed first. In some examples, the score can be determined from score=b/k/v, where b is the total amount of bandwidth demand, k is the total number of flows and v is the number of tenant VMs 510 in the cluster. When clustered by data flows, as shown the example shown by FIG. 5B, the upper cluster 520 has four VMs 510 (#1, #2, #3, and #4) and three data flows 511, and the bottom cluster 522 has three VMs (#3, #4, #5), including an NSVM 512, and two data flows 511. Assuming that the score of the bottom cluster 522 is higher than the upper cluster 520, the bottom cluster 522 can be placed first. Additionally, the VMs 510 are placed in clusters from highest to lowest score.

As further illustrated by FIG. 5C, in the heuristic process, a determination is made for a host 530 (e.g., server or other physical cluster, such as server rack) that has the largest number of free VM slots. The VMs 510 with the largest amount of traffic demand (either sending or receiving) are assigned to available slots of the identified host 530 first. If all slots in the current host 530 become occupied by VMs 510, another host 532 closest is selected. Selection of a next host 532 can factor proximity, to minimize, for example, congestion. The remaining VMs are assigned to the newly initiated host 532. In the example provided, the process can be repeated until all VMs 510 in the cluster are assigned to hosts 530, 532.

FIG. 5C illustrates that some of the VMs 510 (as shown by #3 #4 and #5) do not sit in the same host where VM #1 and VM#2 are located because VMs in the bottom data flow cluster 522 (FIG. 5B) are placed first and total VM slots of a server are limited (e.g., total slots in the example provided is 4). As a result, there is cross-server flow amongst linked VMs 510 (shown between VM#1 and VM#3, and VM#2 and VM#4).

The heuristic process can include VM migration to reduce the amount of bandwidth demand by the flows. For example, in FIG. 5D, one of the VMs 510 (VM#4) is moved from the host 530 to the host 532. For example, the VM manager 112 (see FIG. 1) of the network controller 110 (see FIG. 1) can move one of the VMs 510 (#4) from the host 532 to the host 530.

Figure 5E:
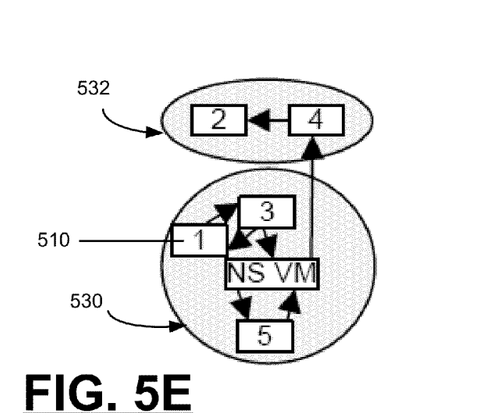

Similarly, FIG. 5E illustrates an example in which link congestion is detected and handled. In the example provided, one of the links between connected VMs 510 (VM#1 and VM#3) link may be deemed congested, for inability to guarantee the minimum bandwidth demand for the data flows that cross it. The link congestion can be addressed by moving one of the VMs 510 (VM#1) from host 532 to host 530. Additionally, the chance of link congestion can be reduced by including a virtual switch in the server that is the host. Further observation can be made to determine if link congestion is resolved, and also to determine whether moving the VMs avoids further congested link. The process can be repeated until either all VMs 510 in one partition move to the other partition, or link congestion is resolved.

Hardware Diagram

Figure 6:
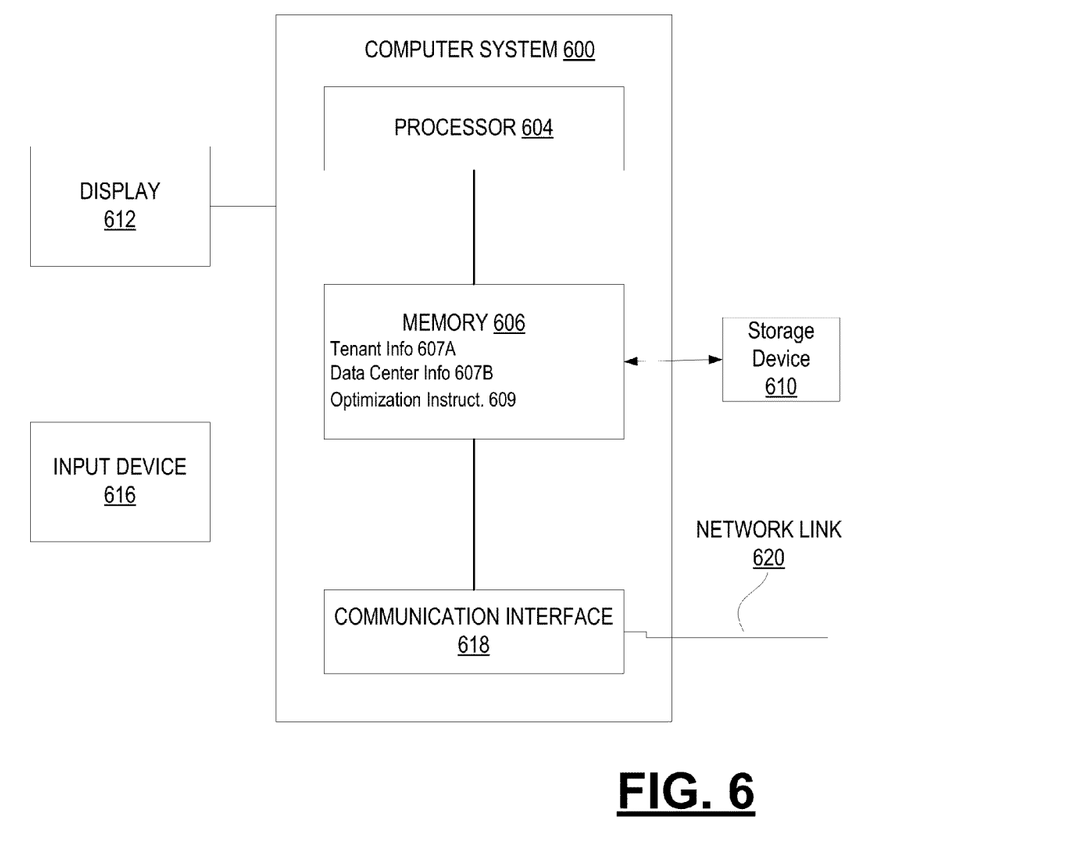
FIG. 6 illustrates an example computing system which can be implemented with one or more embodiments.

FIG. 6 illustrates an example computing system to implement mapping of a tenant topology onto a data center, according to one or more embodiments. The computing system 600 can correspond to, for example, a network controller 110 (see FIG. 1). The computing system 600 includes a processor 604, memory 606, and communication interface 618. The memory 606 can store tenant information 607A such as tenant topology information 111 (see FIG. 1), data center information 607B identifying the physical resources of the data center network 10 (see FIG. 1) (including servers, available slots on servers, physical switches etc.) and optimization instructions 609 for implementing one or more optimization processes such as described with examples provided herein. The processor 604 can use instructions the information 607A, 607B and the instructions 611 to implement the desired tenant topology on the physical resources of the data center network 10, with optimization of constraints that yield minimal use or cost to the tenant.

The communication interface 618 may enable the computing system 600 (operating as network controller 110) to communicate with other servers or resources of the data center network 10.

In some embodiments, processor 604 provides functionality that utilizes the information 607A and 607B, with the instructions 609, to execute a series of operations. Such information 607A, 607B and instructions 609 may be read into memory 606 from another source, such as from machine-readable medium, or a storage device. Execution of the sequences of instructions contained in memory 606 causes processor 604 to perform operations such as described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for providing a virtual network topology in a data center network, the method being implemented by one or more processors and comprising:

receiving topology input from a tenant of the data center network for the virtual network topology, the topology input including data flow information, corresponding to data flows indicating requirements of the virtual network topology, wherein the data flows include source and destination VMs, bandwidth requirements for data flows, and network services for data flows;

based on the data flow information, determining a minimal number of network service virtual machines (NSVMs) required to implement the virtual network topology for the tenant, wherein determining the minimal number of NSVMs includes assigning, based on the data flows, each of a set of virtual machines (VMs) to one or more of the network resources based on a traffic demand associated with the assigned VM;

determining, based on a monetary cost, an optimal arrangement of network resources of the data center network to service the minimal number of NSVMs, wherein the optimal arrangement is implemented to minimize the monetary cost using the number of NSVMs needed, the amount of server resources needed, and bandwidth constraints; and wherein determining the minimal number of NSVMs further includes (i) identifying, based on the data flow information, potential link congestion between the VMs and (ii) performing at least one of swapping or migrating one or more of the VMs to reduce bandwidth demand of the data flows.

2. The method of claim 1, wherein (d) determining the optimal arrangement of network resources is further based on a monetary value for network traffic requirements to implement the virtual network topology.

3. The method of claim 1, wherein determining the optimal arrangement of network resources is further based on a monetary cost associated with running one or more of the network resources to implement the virtual network topology.

4. The method of claim 1, wherein determining the optimal arrangement of network resources is further based on a limit on data exchange between two or more of the network resources of the data center network.

5. A non-transitory computer-readable medium storing instructions for providing a virtual network topology in a data center network, wherein the instructions, when executed by one or more processors, cause the one or more processors to perform operations comprising:

receiving topology input from a tenant of the data center network for the virtual network topology, the topology input including data flow information, corresponding to data flows indicating requirements of the virtual network topology, wherein the data flows include source and destination VMs, bandwidth requirements for data flows, and network services for data flows;

based on the data flow information, determining a minimal number of network service virtual machines (NSVMs) required to implement the virtual network topology for the tenant, wherein determining the minimal number of NSVMs includes assigning, based on the data flows, each of a set of virtual machines (VMs) to one or more of the network resources based on a traffic demand associated with the assigned VM;

determining, based on a monetary cost, an optimized arrangement of network resources of the data center network to service the minimal number of NSVMs, wherein the optimal arrangement is implemented to minimize the monetary cost using the number of NSVMs needed, the amount of server resources needed, and bandwidth constraints; and wherein determining the minimal number of NSVMs further includes (i) identifying, based on the data flow information, potential link congestion between the VMs and (ii) performing at least one of swapping or migrating one or more of the VMs to reduce bandwidth demand of the data flows.

6. The non-transitory computer-readable medium of claim 5, wherein determining the optimized arrangement of network resources is further based on a monetary value for network traffic requirements to implement the virtual network topology.

7. The non-transitory computer-readable medium of claim 5, wherein determining the optimized arrangement of network resources is further based on a monetary cost associated with running one or more of the network resources to implement the virtual network topology.

8. The non-transitory computer-readable medium of claim 5, wherein determining the optimal arrangement of network resources is further based on a limit on data exchange between two or more of the network resources of the data center network.

9. A computer system for a data center network comprising:
   a memory storing instructions for providing a virtual network topology in the data center;
   one or more processors to execute the instructions, wherein the instructions, when executed by the one or more processors, cause the one or more processors to:
   receive topology input from a tenant of the data center network for the virtual network topology, the topology input including data flow information, corresponding to data flows indicating requirements of the virtual network topology, wherein the data flows include source and destination VMs, bandwidth requirements for data flows, and network services for data flows;
   based on the data flow information, determining a minimal number of network service virtual machines (NSVMs) required to implement the virtual network topology for the tenant, wherein determining the minimal number of NSVMs includes assigning, based on the data flows, each of a set of virtual machines (VMs) to one or more of the network resources based on a traffic demand associated with the assigned VM;
   determine, based on a monetary cost, an optimal arrangement of network resources of the data center network to service the minimal number of NSVMs, wherein the optimal arrangement is implemented to minimize the monetary cost using the number of NSVMs needed, the amount of server resources needed, and bandwidth constraints; and
   wherein determining the minimal number of NSVMs further includes (i) identifying, based on the data flow information, potential link congestion between the VMs and (ii) performing at least one of swapping or migrating one or more of the VMs to reduce bandwidth demand of the data flows.

10. The computer system of claim 9, wherein determining the optimal arrangement of network resources is further based on a monetary value for network traffic requirements to implement the virtual network topology.

11. The computer system of claim 9, wherein determining the optimal arrangement of network cost function is further based on a monetary cost associated with running one or more of the network resources to implement the virtual network topology.

* * * * *

UNITED STATES PATENT AND TRADEMARK OFFICE
CERTIFICATE OF CORRECTION

PATENT NO. : 8,943,499 B2  
APPLICATION NO. : 13/460836  
DATED : January 27, 2015  
INVENTOR(S) : Yoshio Turner et al.

Page 1 of 1

It is certified that error appears in the above-identified patent and that said Letters Patent is hereby corrected as shown below:

In the Claims

In column 12, line 26, in Claim 2, delete "wherein (d)" and insert -- wherein --, therefor.

Signed and Sealed this  
Nineteenth Day of May, 2015

Michelle K. Lee  
*Director of the United States Patent and Trademark Office*